(12) United States Patent
Damerau et al.

(10) Patent No.: US 7,177,796 B1
(45) Date of Patent: Feb. 13, 2007

(54) AUTOMATED SET UP OF WEB-BASED NATURAL LANGUAGE INTERFACE

(75) Inventors: Frederick J. Damerau, North Salem, NY (US); David E. Johnson, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1327 days.

(21) Appl. No.: 09/605,709

(22) Filed: Jun. 27, 2000

(51) Int. Cl.
*G06F 17/27* (2006.01)

(52) U.S. Cl. .................. 704/9; 704/257; 704/270

(58) Field of Classification Search ............. 704/270.1, 704/270, 271, 272, 275; 707/3, 6
See application file for complete search history.

(56) References Cited

U.S. PATENT DOCUMENTS

| | | | | |
|---|---|---|---|---|
| 5,742,816 A | * | 4/1998 | Barr et al. ...................... | 707/3 |
| 5,819,220 A | * | 10/1998 | Sarukkai et al. ......... | 704/270.1 |
| 5,822,731 A | * | 10/1998 | Schultz ..................... | 704/270.1 |
| 6,029,195 A | * | 2/2000 | Herz ........................ | 725/116 |
| 6,185,531 B1 | * | 2/2001 | Schwartz et al. ........... | 704/256 |
| 6,311,182 B1 | * | 10/2001 | Colbath et al. ................ | 707/6 |

OTHER PUBLICATIONS

M. K. Brown, Grammar Representation Requirements for Voice Markup Languages, Bell Labs, Murray Hill, NJ, Dec. 199.*
Ming-Hsuan Yang et al., A Natural Language Processing Based Internet Agent, IEEE 1997, pp. 100-105.*
Boris Katz et al., Integrating Web Resources and Lexicon into a Natural Language Query System, IEEE 1999, pp. 255-261.*
Doug Sapp et al., Intelligent Web Representatives, 11 th IEEE International Conference on Nov. 1999.*

* cited by examiner

*Primary Examiner*—Abul K. Azad
(74) *Attorney, Agent, or Firm*—Whitham, Curtis, Christofferson & Cook, PC; Stephen C. Kaufman

(57) ABSTRACT

A procedure automates the process of setting up an instance of a conversational natural language interface for a Web site. By automating the process of setting up a new Web site, the process enables a new interface to be created by anyone. Subsequent manual tuning of the interface is possible and much easier to do than creating an interface from scratch. In order to set up an instance of a natural language conversational interface, it is necessary to define a hierarchy of topics into which individual documents or Web pages can be classified, provide a keyword index for those documents for an associated search engine, and for each node in the hierarchy, specify a mechanism for associating an input natural language (NL) query to the node.

3 Claims, 2 Drawing Sheets

AUTOMATED SET UP OF WEB-BASED NATURAL LANGUAGE INTERFACE

CROSS-REFERENCE TO RELATED APPLICATION

This application is related to the subject matter disclosed in co-pending patent application Ser. No. 09/570,788 filed May 15, 2000, by David E. Johnson, Frank J. Oles and Thilo W. Goetz for "Interactive Automated Response System" and assigned to a common assignee. The disclosure of application Ser. No. 09/570,788 is incorporated herein by reference.

DESCRIPTION

BACKGROUND OF THE INVENTION

1. Field of the Invention

The present invention generally relates to natural language systems and, more particularly, to an automated method for setting up a Web-based natural language interface.

2. Background Description

The World Wide Web (WWW) portion of the Internet has seen an explosion of Web sites for various individual and business purposes. This in turn has led to a growing industry in Do It Yourself (DIY) software and Web design services to assist those who want to set up a Web site.

The standard method of setting up a new Web site involves a substantial amount of intellectual effort and manual processing. A typical commercial Web site might require the services of seven to nine members of a professional team working nine to fifteen months to produce. It is difficult or impossible for the average Web site administrator to do this successfully without assistance. It is even more difficult to set up a natural language query interface for a Web site once it has been built.

SUMMARY OF THE INVENTION

It is therefore an object of the present invention to provide a procedure that automates the process of setting up an instance of a natural language interface for a Web site.

It is another object of the invention to automate the process setting up a natural language interface to an existing Web site.

This invention, by automating the process of setting up a new Web site, enables a new interface to be created by anyone. Subsequent manual tuning of the interface is possible and much easier to do than creating an interface from scratch. The invention solves the problem by bringing together a number of ideas and techniques, some of which have been used in natural language processing for other purposes. In order to set up an instance of a natural language interface, it is necessary to (1) define a hierarchy of topics into which individual documents or Web pages can be classified,
(2) provide a keyword index for those documents for an associated search engine, and
(3) for each node in the hierarchy, specify a mechanism for associating an input natural language (NL) query to the node. (In the preferred embodiment, this mechanism is a rule set and associated rule applier.)

To solve step (1), we note that the uniform resource locators (URLs) of the Web pages associated with a single site are often organized into a coherent hierarchy of topics. On reflection, this is not surprising, since good Web design encourages logical movement from page to page. Thus, a bank might have a Web page with the URL "www.bank.com/loans". It will have links to pages with URLs "www.bank.com/loans/auto" and "www.bank.com/loans/homemortgage", and so forth. (It will be understood by those skilled in the art that the URLs "www.bank.com/loans", "www.bank.com/loans/auto" and "www.bank.com/loans/homemortgage" are hypothetical, as opposed to real, URLs for the sake of this example.) This is clearly a topic hierarchy of exactly the kind necessary for establishing the NLCI, in which "loans" is a high level node and "auto" and "homemortgage" are nodes subordinate to it. If these are the lowest level of the hierarchy, the Web pages they point to are leaves.

To solve step (2), we use methods from statistical natural language processing. From each document, we generate a set of single words, bi-grams, etc., up to n-grams for some n. However, these are not necessarily sequential n-grams. We allow gaps between the words making up the n-gram. The gaps are limited by establishing a distance d which is the maximum separation between the first and last words of the n-gram. This tactic is partial compensation for the variability allowed by natural language in expressing phrases. For example, one can say "input documents", or one might say "input text documents". The method described would generate an n-gram "input documents" from both of these. (In the preferred embodiment, words are reduced to stems, so that actual n-gram generated would be "input document".) The most frequent n-grams occurring in a document, up to some number m, are used as the keyboard index for the document.

An example of another use for sparse n-grams, in this case bi-grams which are called "cooccurrence pairs" is explained by Ido Dagan, Shaul Marcus and Shaul Markovitch in "Contextual Word Similarity and Estimation from Sparse Data", *Association for Computational Linguistics*, pp. 164–171 (1993). The extension from bi-grams to n-grams is an obvious one.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
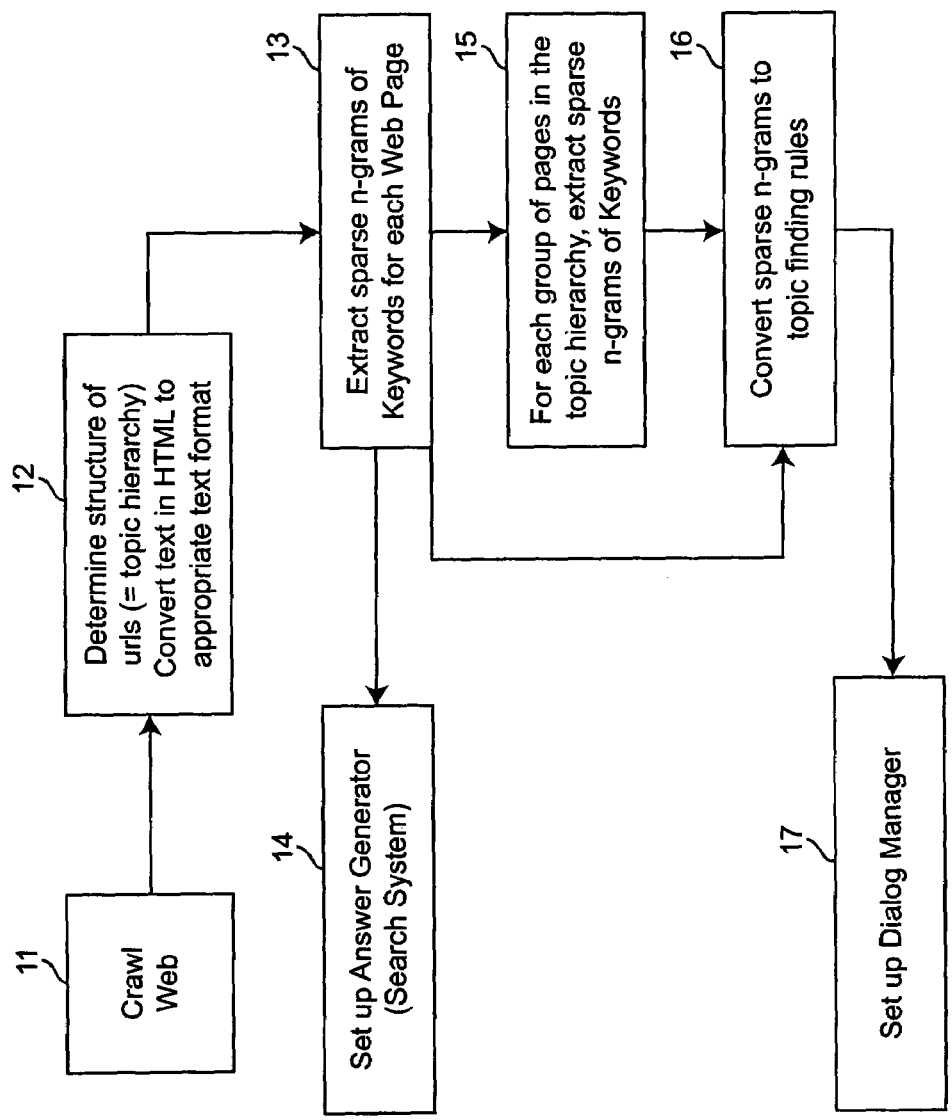
FIG. 1 is a flow diagram of the automated set up procedure according to the invention.

Referring now to the drawings, and more particularly to FIG. 1, there is shown a flow diagram of the automated set up procedure. A program implementing a Web crawler is invoked in function block 11, beginning at the home page of the site for which a natural language interface is to be generated. The output of this module is a file of Web pages in HyperText Markup Language (HTML). In function block 12, the Uniform Resource Locators (URLs) of the Web pages are processed to induce a hierarchy of topics for the site and the HTML formatted pages are converted to the appropriate standard format. In a preferred implementation of the invention, the standard format is eXtensible Markup Language (XML). In function block 13, sparse n-grams are extracted from each page to serve as index terms for the page. The index terms are used to set up an answer generator (search engine) for the page in function block 14. In function block 15, a set of sparse n-grams is generated for each of the topics found in function block 12 by grouping together all the documents having that topic. Those n-grams satisfying some criterion for significant association with the topic are saved. In a preferred implementation of the invention, the criterion used is the chi-square measure. Optionally, another statistical test can be made to associate a confidence measure with each rule. In the preferred implementation of the invention, the confidence measure is the percentage of the time the underlying n-gram occurs in the topic. Each sparse n-gram is converted to a rule in which each term of an n-gram is a term in the rule, and the topic is the rule consequent, in function block 16. Once the preceding steps have been accomplished, all the necessary data is at hand to finish setting up the natural language interface in function block 17. Setting up the dialog manager is accomplished according to the process described in copending patent application Ser. No. 09/570,788.

Figure 2:
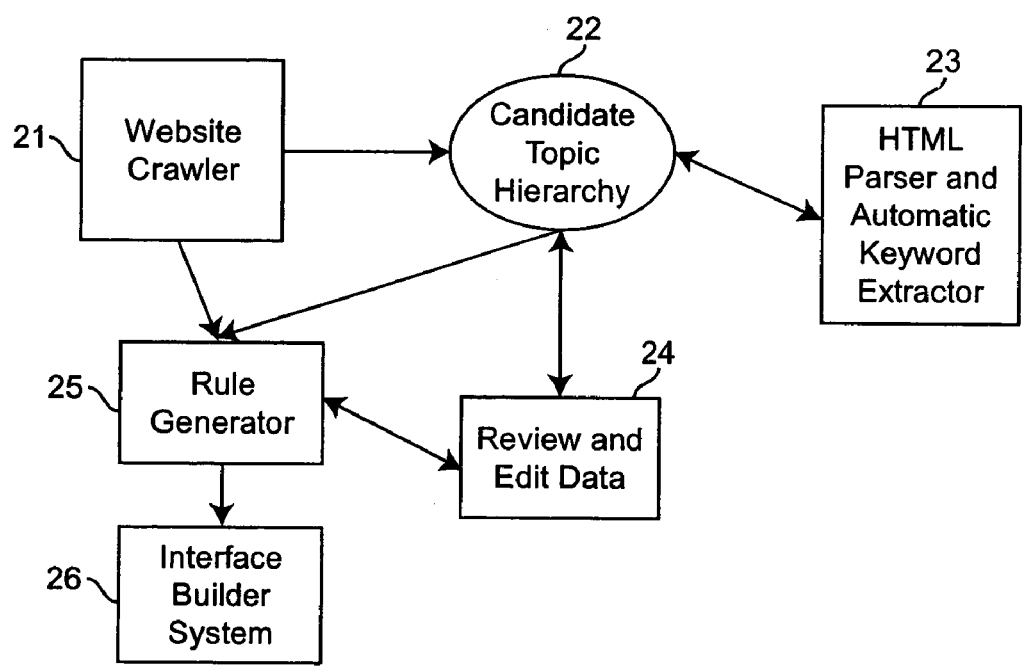
FIG. 2 is a block diagram showing the components of the system and their inter-relationships.

FIG. 2 shows the components of the system and their inter-relationships. These include the Web crawler module 21 which begins at some designated home page(s) and systematically finds all the pages reachable from these initial pages, recursively. Using the URLs of these pages, mode 22 finds the topic hierarchy of this site. Note that there might be more than one root (i.e., initial home page) resulting in more than one rooted tree (hierarchy). If there is more than one rooted tree, then the final hierarchy is just

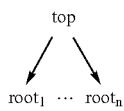

with new top node "Top$_n$. Module 23 uses the extracted pages along with the hierarchy to find key words and sparse phrases which can serve as index terms for the respective pages. Module 24 is an optional mode for manual review and change of the decisions made by the automated system. Module 25 is a rules generating module which generates rules for each of the topics identified by module 22. Module 25 also uses the documents generated by the Web crawler module 21. The rules generated by module 25 may optionally be edited manually, as indicated by the interface between modules 24 and 25. Module 26 is the interface builder system which uses the outputs of modules 23, 25 and, optionally, 24.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. An automated method for setting up a natural language interface in a Web site, comprising the steps of:
    defining a hierarchy of topics into which individual documents or Web pages can be classified;
    generating a keyword index for those documents; and
    for each topic in the hierarchy, associating a set of n-grams to a topic in the topic hierarchy, which set of n-grams is distinctive to that topic and wherein the n-grams maybe sparse or non-sparse n-grams
    wherein the step of generating a keyword index comprises the step of extracting sparse n-grams of keywords for each group of pages in the topic hierarchy.

2. An automated method for setting up a natural language interface in a Web site, comprising the steps of:
    automatically inducing a topic hierarchy by examining a structure of the Web site;
    creating n-grams from pages in the Web site that are associated with a topic in the topic hierarchy wherein the n-grams may be sparse in-grams or non-sparse n-grams; and
    creating rules from the n-grams, wherein each topic has associated rules that are used to decide if a new input document or query references the topic,
    wherein the step of creating rules is performed automatically and further comprising the optional step of manually editing the rules.

3. An automated method for setting up a natural language interface in a Web site, comprising the steps of:
    defining a hierarchy of topics into which individual documents or Web pages can be classified;
    generating a keyword index for those documents;
    for each topic in the hierarchy, associating a set of n-grams to a topic in the topic hierarchy, which set of n-grams is distinctive to that topic and wherein the n-grams maybe sparse or non-sparse n-grams; and
    converting the set of n-grams to classification rules.

* * * * *